Jan. 8, 1957 E. D. WILKIN 2,776,844
WHEEL ADJUSTING MEANS FOR LAWN MOWER
Filed Oct. 11, 1954 2 Sheets-Sheet 1

ELLSWORTH D. WILKIN
INVENTOR

BY
ATTORNEY

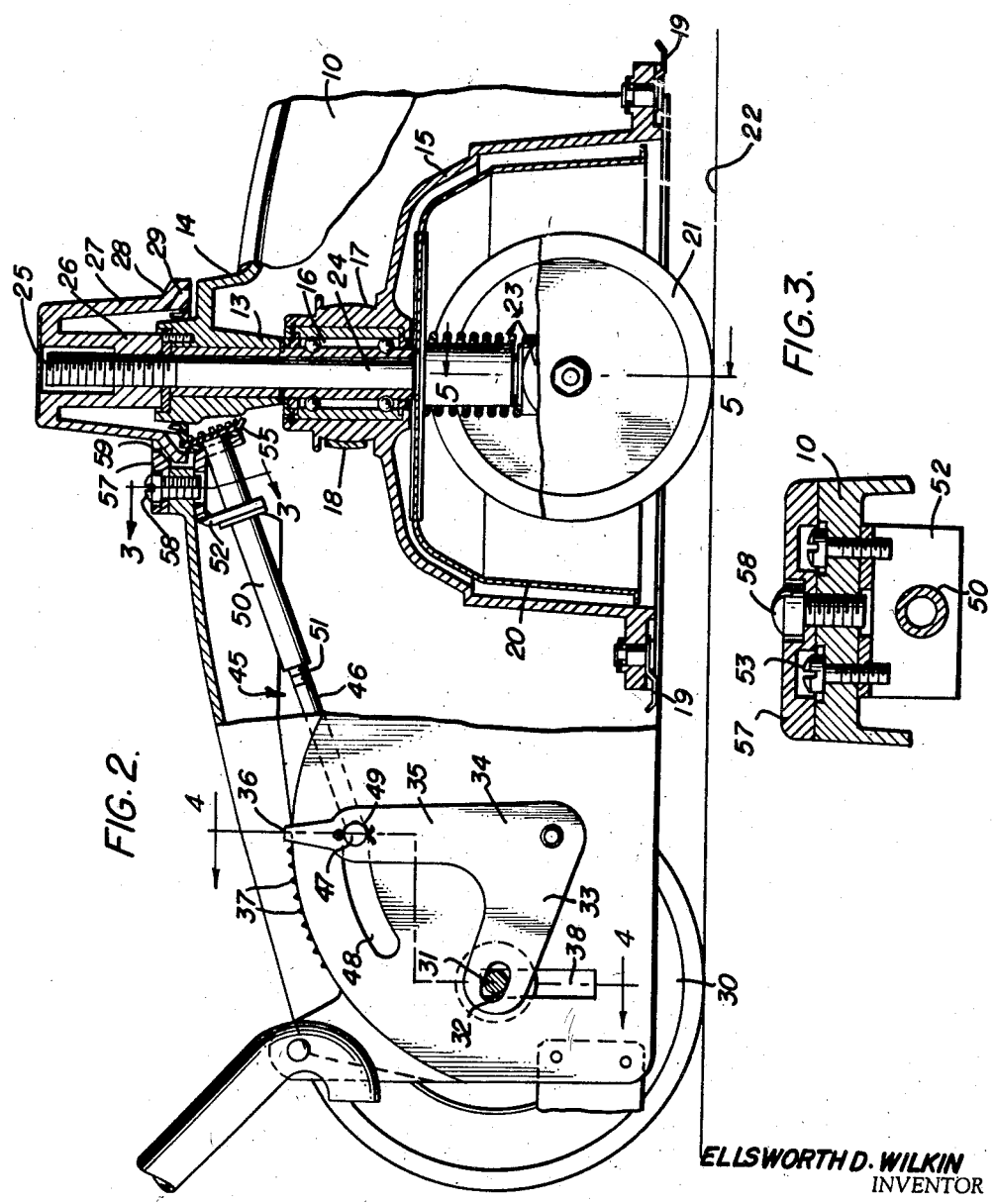

United States Patent Office 2,776,844
Patented Jan. 8, 1957

2,776,844

WHEEL ADJUSTING MEANS FOR LAWN MOWER

Ellsworth D. Wilkin, Los Angeles, Calif., assignor to McCulloch Motors Corporation, Los Angeles, Calif., a corporation of Wisconsin Application October 11, 1954, Serial No. 461,526

9 Claims. (Cl. 280—44)

This invention relates to adjusting means for lawn mowers of the type having a carriage or a frame supported by a plurality of wheels which roll along the ground and the invention relates in particular to a simple means for adjusting these wheels up and down with relation to the frame so as to raise and lower the frame with relation to the ground whereby the cutting plane of the cutters of the lawn mower may be adjusted. It will be understood that the raising of the wheels with relation to the frame will result in lowering the frame and the cutters carried thereby to a position closer to the ground.

It is an object of the invention to provide a simple wheel adjusting means for a lawn mower of the type disclosed in the copending application of Austin Gudmundsen, for Power Lawn Mower, Serial No. 477,633, filed December 27, 1954. Therein a pair of inverted-cup rotors are provided on which the cutting blades are mounted, with supporting wheels within these rotors for engagement with the ground directly underneath the rotors for effectively preventing the rotors from coming into engagement with the ground. Additional wheels are adjustably supported on the lawn mower frame in spaced relation to the rotors.

It is an object of the invention to provide an adjusting means having parts which act automatically when one of the wheels of the motor is adjusted to adjust to the same extent another wheel of the mower.

It is a further object of the invention to provide a simple means, responsive to the turning of a knob, for adjusting the wheels which lie within the rotor, and to further provide means also acting in response to the rotation of the knob to adjust a second frame supporting wheel.

It is a further object of the invention to provide a lever means for supporting the second wheel referred to in the foregoing paragraph, and means acting in response to the rotation of the adjusting knob to swing this lever so that the second wheel will be vertically adjusted to the same extent as the rotation of the knob adjusts the wheel or wheels located within the rotor.

It is a further object of the invention to provide a simple means in association with the lever type mounting for the second wheel which will show directly upon a scale the distance at which the cutters are spaced above the plane defined by the wheels.

A further object of the invention is to provide a simple and effective means for locking the wheels in the positions into which they have been adjusted.

Further objects and advantages of the invention may be brought out in the following part of the specification wherein small details of a preferred form of my invention have been described for the purpose of making a complete disclosure, without however, intending to limit the scope of the invention which is set forth in the appended claims.

Referring to the accompanying drawings which are for illustrative purposes only:

Fig. 2 is an enlarged fragmentary sectional view taken as indicated by the line 2—2 of Fig. 1;

Fig. 3 is an enlarged fragmentary sectional view taken as indicated by the line 3—3 of Fig. 2;

Figure 1:
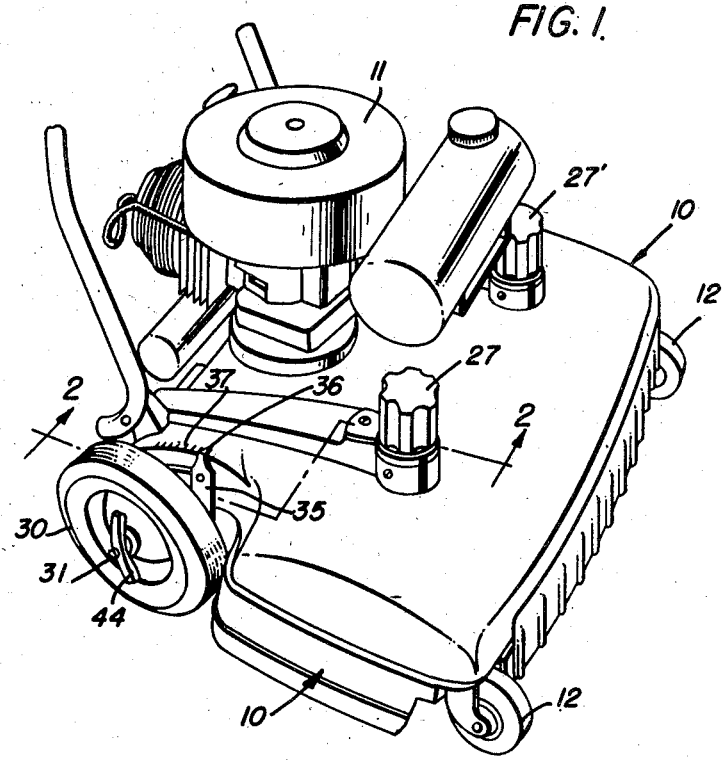
Fig. 1 is a perspective view of a lawn mower embodying the present invention.

The lawn mower, as shown in Fig. 1, has a housing or frame 10 on which an engine 11 is mounted. The frame 10, in the preferred form of the invention shown, is supported by a plurality of wheels, only three of which appear in Fig. 1. Underneath the front corners of the frame 10 there are auxiliary wheels 12 which prevent the forward portion of the frame 10 from striking against upstanding obstructions.

As shown in the enlarged fragmentary sectional view, Fig. 2, a hollow shaft or quill 13 projects downwardly from the top wall 14 of the shell 10. A rotor 15 in the form of an inverted cup is supported by bearings 16 on the lower end of the hollow shaft 13, and a pulley 17 is provided for engagement by a belt 18 which is driven from the engine 11 by means not shown. The periphery of the rotor 15 has thereon cutters 19 which travel at relatively high velocity when the rotor 15 is revolved and perform the grass cutting operation. A stationary cup-shaped liner 20 is supported within the cavity of the rotor 15.

Within the cavity of the cup 15 and likewise within the liner 20, wheels 21 are supported, the lower portions of these wheels 21 projecting below the lower face of the rotor 15 and being adapted to roll upon the ground or upon grass covering the same, to hold the rotor 15 and the blade 19 in a desired elevated position above the surface 22. The wheels 21 are carried by a transverse fitting 23 which is secured at the lower end of a shaft or bar 24 which extends up through the hollow shaft 13 and on its upper end has a screw 25. The hollow shaft 13 not only functions as a support for the bearing 16 but also as a vertical guide for the bar 24 which is prevented from rotation by a key but may have limited vertical adjusting movement in the hollow shaft 13. A nut 26 is screwed upon the upper threaded end 25 of the bar 24, this nut 26 being formed as a part of an adjusting knob 27 having at its lower end a flange 28 on the lower face of which beveled gear teeth 29 are formed.

Figures 4, 5:
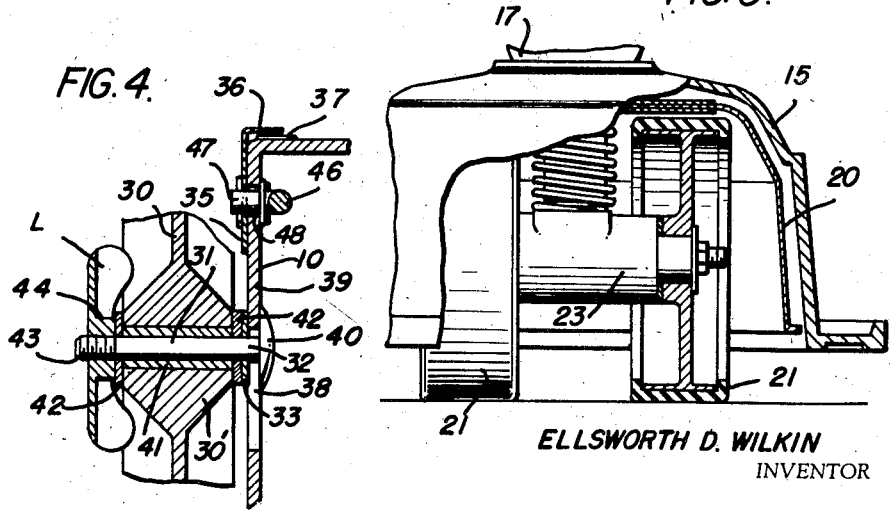
Fig. 4 is an enlarged fragmentary sectional view taken as indicated by the line 4—4 of Fig. 2.
Fig 5. is a fragmentary sectional view taken as indicated by the line 5—5 of Fig. 2 to show the manner of mounting wheels within the rotor of the mower.

As shown in Figs. 1 and 2, a second wheel 30 is supported rearwardly of the wheel 21, on a transverse pin which passes through an opening 32 in the laterally extending arm 33 of a bell crank lever 34, the remaining arm 35 of the bell crank lever projecting upwardly and having on the upper end thereof a pointer or indicator 36 arranged to travel across a dial 37 formed on the frame 10. As shown in Figs. 2 and 4, the pin 31 also projects through a slot 38 in a vertical wall 39 of the frame 10 and has on its inner end a head 40 arranged for clamping engagement with the wall 39.

The outwardly projecting portion of the pin 31 has thereon a bearing sleeve 41 which is arranged between washers 42. The outer end of the pin 31 has threads 43 to receive a wing nut 44 which, upon being tightened, will clamp firmly together the parts 39, 33, 41 and 42, thereby locking the pin 31 and its supported sleeve bearing 41 rigidly in place. The second wheel 30 is provided with a hub 30' arranged for rotation upon the bearing sleeve 41.

As shown in Figs. 2 and 4, means, actuated by the knob 27, are provided for swinging the bell crank 34 back and forth so that, when the wing nut 44 is loosened, the pin 31 may be raised and lowered in the slot 38 and relative to the frame 10, thereby raising or lowering the wheel 30 with relation to the frame 10 simultaneously with the raising and lowering of the wheel 21. This adjusting means comprises a screw jack 45 arranged to move the bell crank arm 35. It consists of a rod or stem 46 having a laterally directed end 47 which projects through a slot 48 in the wall 10 and also through an opening 49 in the upper end of the bell crank arm 35. The screw jack also includes a sleeve 50 which is internally threaded and is screwed upon the threaded rightward end 51 of the stem 46. As shown in Fig. 2, the rightward end of the sleeve 50 is supported by a bracket 52 which is secured to the frame 10 by screws 53. A bevel gear 55, fixed on the rightward end of the sleeve 52, meshes with the bevel gear formed by the gear teeth 29 of the knob 27 and connects the sleeve 50 and the nut 26 for simultaneous rotation thereby synchronizing the raising and lowering of the wheels. Accordingly, rotation of the knob 27 not only causes the nut 26 to vertically move the bar 24 but it also rotates the sleeve 50 so as to move the stem 46 which in turn transmits movement to the bell crank 34. A plate 57, Figs. 2 and 3, secured to the frame 10 by a screw 58, has a lip 59 which projects over a portion of the flange 28 of the knob 27 and thereby limits upward movement of the knob with relation to the frame 10.

In the foregoing I have described a set of wheels consisting of first wheel 21 and a second wheel 30, with means for simultaneously adjusting these wheels. It should be understood that a similar arrangement of wheels 21 and 30 is disposed on the far side of the lawn mower frame 10, Fig. 1. Since the means for supporting and adjusting these other wheels are substantially the duplicates of the supporting and adjusting means shown in Fig. 2. It is deemed not necessary to duplicate the disclosure other than to indicate the second knob 27' by which the adjustment of the second set of wheels is accomplished.

Referring again to Figs. 1, 2 and 4, should a change in the cutting level of the cutters 19 be desired, the operator may loosen the wing nut 44 so that the pin 31 may be then free to slide in the vertical slot 38. The knob 27 may be then turned in the desired direction to raise or lower the bar 24 which will accomplish a raising or lowering of the wheel 21 with relation to the frame 10. At the same time the screw jack 45 will swing the bell crank 34 so as to raise or lower the wheel 30. The position of the pointer 36 on the dial 37 may be observed as this adjustment is made, and after the adjustment is completed, the wing nut 44 may be tightened so as to clamp the parts which support the wheel 30.

I claim:

1. In an adjusting means for the wheels of a lawn mower having a frame and first and second spaced supporting wheels: a vertical guide on said frame above said first wheel; a bar supported on said guide, said bar having at its lower end means for supporting said first wheel and having at its upper end a screw; a nut on said screw operative upon rotation to raise and lower said screw so as to thereby raise and lower said first wheel; a bell crank pivoted to said frame; axle means on one of the arms of said bell crank for supporting said second wheel so that the swinging of said bell crank will move said second wheel up and down; a stem extending from the other arm of said bell crank toward said nut, the end of said stem being threaded; an internally threaded sleeve screwed onto the threaded end of said stem; and means for rotating said sleeve so as to effect axial movement of said stem comprising a driven gear fixed on said sleeve and a driving gear fixed on said nut meshing with said driven gear whereby rotation of said nut will act through said stem to swing said bell crank and raise and lower said second wheel.

2. In an adjusting means for the wheels of a lawn mower having a frame and first and second spaced supporting wheels: a vertical guide on said frame above said first wheel; a bar supported in said guide, said bar having at its lower end means for supporting said first wheel and having at its upper end a screw; a nut on said screw operative upon rotation to raise and lower said screw so as to thereby raise and lower said first wheel; a bell crank pivoted to said frame; axle means on one of the arms of said bell crank for supporting said second wheel so that the swinging of said bell crank will move said second wheel up and down; and screw means actuated by a rotation of said nut for swinging said bell crank and raising and lowering said second wheel as said first wheel is raised and lowered by said bar.

3. In an adjusting means for the wheels of a lawn mower as defined in claim 2 wherein said screw means comprises telescoping threadedly engaging parts, one of which is connected to said bell crank, and means acting in response to rotation of said nut to rotate the other of said screw parts.

4. In an adjusting means for the wheels of a lawn mower having a frame and first and second spaced supporting wheels: a vertical guide on said frame above said first wheel; a bar supported in said guide, said bar having at its lower end means for supporting said first wheel and having at its upper end a screw; a nut on said screw operative upon rotation to directly raise and lower said screw so as to thereby raise and lower said first wheel; and mechanical linkage means connected to said second wheel and acting in response to the rotation of said nut to raise and lower said second wheel simultaneously with the raising and lowering of said bar and said first wheel.

5. In an adjusting means for the wheels of a lawn mower having a frame and first and second spaced supporting wheels: a vertical guide on said frame above said first wheel; a bar supported in said guide, said bar having at its lower end means for supporting said first wheel and having at its upper end a screw; a nut on said screw operative upon rotation to raise and lower said screw so as to thereby raise and lower said first wheel; a lever pivoted on said frame for up and down swinging movement; axle means on said lever for supporting said second wheel so that the swinging of said lever will move said second wheel up and down; a stem extending from said lever toward said nut, the end of said stem being threaded; an internally threaded sleeve screwed onto the threaded end of said stem; and means for rotating said sleeve so as to effect axial movement of said stem comprising a driven gear fixed on said sleeve and a driving gear fixed on said nut meshing with said driven gear whereby rotation of said nut will act through said stem to swing said lever and raise and lower said second wheel.

6. In an adjusting means for the wheels of a lawn mower having a frame and first and second spaced supporting wheels: a vertical guide on said frame above said first wheel; a bar supported in said guide, said bar having at its lower end means for supporting said first wheel and having at its upper end a screw; a nut on said screw operative upon rotation to raise and lower said screw so as to thereby raise and lower said first wheel; a lever pivoted on said frame for up and down swinging movement; axle means on said lever for supporting said second wheel so that the swinging of said lever will move said second wheel up and down; and screw means connected to said lever and acuated by the rotation of said nut to swing said lever in directions to raise and lower said second wheel as said first wheel is raised and lowered by said bar.

7. An adjusting means as defined in claim 6 having a scale on an exposed portion of said frame adjacent a portion of said lever said lever to indicate with reference to the position of said lever the position of said wheels with relation to said frame.

8. In an adjusting means for the wheels of a lawn mower having a frame and first and second spaced supporting wheels: a vertical guide on said frame above said first wheel; a bar supported in said guide, said bar having at its lower end means for supporting said first wheel and having at its upper end a screw; a nut on said screw operative upon rotation to raise and lower said screw so as to thereby raise and lower said first wheel; a lever pivoted on said frame for up and down swinging movement; axle means on said lever for supporting said second wheel so that the swinging of said lever will move said second wheel up and down; means for swinging said lever so as to raise and lower said second wheel comprising threadedly engaging screw members, one of said screw members being connected to said lever and the other of said screw member being supported for rotation so that it will be caused to act upon the first named screw member to effect a swinging of said lever; and means for linking said other screw member and said nut together for simultaneous rotation whereby said first and second wheels will be simultaneously raised and lowered.

9. In an adjusting means for the wheels of a lawn mower having a frame and first and second spaced supporting wheels: a vertical guide on said frame above said first wheel; a bar supported in said guide, said bar having at its lower end means for supporting said first wheel and having at its upper end a screw; a nut on said screw operative upon rotation to raise and lower said screw so as to thereby raise and lower said first wheel; a bell crank pivoted to said frame; axle means on one of the arms of said bell crank for supporting said second wheel so that the swinging of said bell crank will move said second wheel up and down; and screw means geared to said nut for simultaneous rotation and being adapted to swing said bell crank and raise and lower said second wheel as rotation of said nut effects raising and lowering of said first wheel.

References Cited in the file of this patent

UNITED STATES PATENTS

| | | |
|---|---|---|
| 1,806,460 | Hopkins | May 19, 1931 |
| 1,837,315 | Becker | Dec. 22, 1931 |